US009587491B2

(12) United States Patent
Bowles (10) Patent No.: US 9,587,491 B2
(45) Date of Patent: Mar. 7, 2017

(54) GUIDANCE SYSTEM FOR A MINING MACHINE (71) Applicant: Joy MM Delaware, Inc., Wilmington, DE (US)

(72) Inventor: Charles Ashenhurst Bowles, Benoni (ZA)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 14/568,295

(22) Filed: Dec. 12, 2014

(65) Prior Publication Data

US 2015/0097411 A1  Apr. 9, 2015

Related U.S. Application Data (63) Continuation-in-part of application No. 14/014,693, filed on Aug. 30, 2013, now Pat. No. 9,151,156.
(Continued)

(51) Int. Cl.
*E21C 35/00* (2006.01)
*E21C 35/08* (2006.01)
(Continued)

(52) U.S. Cl.
CPC ............ *E21C 35/08* (2013.01); *E21C 35/24* (2013.01); *G01B 11/26* (2013.01)

(58) Field of Classification Search
CPC ........................................................ E21C 35/08
See application file for complete search history.

(56) References Cited

U.S. PATENT DOCUMENTS 2,666,631 A  1/1954 Mavor
3,321,248 A  5/1967 Williamson et al.
(Continued)

FOREIGN PATENT DOCUMENTS

CA  2041373 A1  11/1991

OTHER PUBLICATIONS

International Search Report for Application No. PCT/US2011/052287 dated Jan. 17, 2012 (5 pages).
(Continued)

*Primary Examiner* — John Kreck
(74) *Attorney, Agent, or Firm* — Michael Best & Friedrich LLP (57) ABSTRACT A guidance system for mining a seam of material includes a mining machine, a carriage, and a guide assembly. The mining machine includes a cutter head and defines a roll axis extending the length of the machine, a pitch axis extending from one side of the machine to the other side, and a yaw axis extending from a top side of the machine to the bottom side. The carriage includes a first emitter, a second emitter, and a third emitter. The first emitter projects a first laser that is aligned with a seam plane. The second emitter projects a second laser, and the third emitter projects a third laser. The guide assembly includes a first indicator and a target. The first indicator is aligned with the second laser, and the target is aligned with the third laser. The relative positions of the first indicator with respect to the second laser and the target with respect to the third laser indicate the orientation of the roll axis, pitch axis, and yaw axis relative to the seam plane.

15 Claims, 12 Drawing Sheets

Related U.S. Application Data which is a continuation of application No. 13/236,961, filed on Sep. 20, 2011, now Pat. No. 8,523,287.

(60) Provisional application No. 61/403,817, filed on Sep. 22, 2010.

(51) Int. Cl.
*E21C 35/24* (2006.01)
*G01B 11/26* (2006.01)

(56) References Cited

U.S. PATENT DOCUMENTS

| | | | |
|---|---|---|---|
| 3,462,845 A | 8/1969 | Matthews | |
| 3,484,136 A | 12/1969 | Colson | |
| 3,498,673 A | 3/1970 | Coski et al. | |
| 3,517,966 A | 6/1970 | Montacie | |
| 3,560,753 A | 2/1971 | Beug | |
| 3,603,644 A * | 9/1971 | McCleery | E21C 35/223 |
| | | | 299/12 |
| 3,619,069 A | 11/1971 | Alexander | |
| 3,707,330 A | 12/1972 | Pine | |
| 4,027,210 A | 5/1977 | Weber | |
| 4,047,763 A | 9/1977 | Gilliland et al. | |
| 4,111,486 A | 9/1978 | Kumaki et al. | |
| 4,273,468 A | 6/1981 | Cyfka | |
| 4,279,443 A * | 7/1981 | Takahashi | E21C 35/10 |
| | | | 175/45 |
| 4,323,280 A | 4/1982 | Lansberry et al. | |
| 4,345,839 A | 8/1982 | Droescher et al. | |
| 4,390,212 A | 6/1983 | Nitzberg | |
| 4,392,744 A | 7/1983 | Tatsuhama et al. | |
| 4,446,626 A | 5/1984 | Grender et al. | |
| 4,557,524 A | 12/1985 | Melhuish | |
| 4,714,344 A | 12/1987 | Hamar | |
| 4,715,657 A | 12/1987 | Sato et al. | |
| 4,856,384 A | 8/1989 | Wechner | |
| 4,884,847 A | 12/1989 | Bessinger et al. | |
| 4,932,481 A | 6/1990 | Wechner | |
| 5,186,579 A | 2/1993 | Hanamoto et al. | |
| 5,237,384 A | 8/1993 | Fukunaga et al. | |
| 5,295,073 A | 3/1994 | Celette | |
| 5,501,548 A | 3/1996 | Hayashi et al. | |
| 5,529,437 A | 6/1996 | Filipowski et al. | |
| 5,553,925 A | 9/1996 | Merten et al. | |
| 5,911,669 A * | 6/1999 | Stentz | A01D 41/1278 |
| | | | 56/10.2 F |
| 6,025,905 A * | 2/2000 | Sussman | G01N 21/8806 |
| | | | 356/3.01 |
| 6,203,111 B1 | 3/2001 | Ollis et al. | |
| 6,296,317 B1 * | 10/2001 | Ollis | G05D 1/0251 |
| | | | 299/1.05 |
| 6,349,249 B1 * | 2/2002 | Cunningham | E21D 9/004 |
| | | | 180/116 |
| 6,694,233 B1 | 2/2004 | Duff et al. | |
| 6,725,551 B1 | 4/2004 | Sutton | |
| 7,434,322 B2 | 10/2008 | Walser et al. | |
| 7,756,323 B2 * | 7/2010 | Kimmel | G01B 11/2513 |
| | | | 250/236 |
| 7,990,550 B2 | 8/2011 | Aebischer et al. | |
| 8,157,330 B2 | 4/2012 | Niederriter | |
| 2003/0052529 A1 * | 3/2003 | Hakkinen | E21C 35/24 |
| | | | 299/1.05 |

OTHER PUBLICATIONS

International Written Opinion for Application No. PCT/US2011/052287 dated Jan. 17, 2012 (5 pages).

Search Report from the Polish Patent Office for Application No. P-415213 dated May 25, 2016 (2 pages).

* cited by examiner

GUIDANCE SYSTEM FOR A MINING MACHINE

CROSS-REFERENCE TO RELATED APPLICATIONS

This application is a continuation-in-part of prior-filed, co-pending U.S. application Ser. No. 14/014,693, filed Aug. 30, 2013, which is a continuation of U.S. application Ser. No. 13/236,961, filed Sep. 20, 2011, which claims the benefit of U.S. Provisional Application 61/403,817, filed Sep. 22, 2010, the entire contents of all of which are incorporated herein by reference.

BACKGROUND

The present invention relates to mining equipment, and in particular to an underground continuous mining machine.

Remote-controlled continuous mining machines are generally operated by an off-board human operator using a remote control device. The operator is positioned behind the machine and directs operation of the machine by sight. The operator must insure that the mining machine is aligned with the mineral seam, or reef, at all times since it is difficult to rectify the machine's orientation once it deviates. In many circumstances, the reef varies in three dimensions, making it difficult for the mining machine to follow the seam.

SUMMARY OF THE INVENTION

In one embodiment, the invention provides a guidance system for mining a seam of material, the seam of material defining a seam plane, the guidance system comprising a mining machine, a carriage, and a guide assembly. The mining machine includes a cutter head and defines a roll axis extending the length of the machine, a pitch axis extending from one side of the machine to the other side, and a yaw axis extending from a top side of the machine to the bottom side. The carriage includes a first emitter, a second emitter, and a third emitter. The first emitter projects a first laser that is aligned with the seam plane, the second emitter projects a second laser, and the third emitter projects a third laser. The guide assembly includes a first indicator and a target. The first indicator is aligned with the second laser, and the target is aligned with the third laser. The relative positions of the first indicator with respect to the second laser and the target with respect to the third laser indicate the orientation of the roll axis, pitch axis, and yaw axis relative to the seam plane.

In another embodiment, the invention provides a laser emitter carriage for guiding a machine during mining of a mineral seam. The mineral seam defines a seam plane. The laser emitter assembly includes a base, a first emitter, and a second emitter. The first laser emitter is coupled to the base and emits a first planar laser that is aligned with the seam plane. The second laser emitter is coupled to the base and emits a second planar laser for aligning a mining machine.

In yet another embodiment, the invention provides a method for guiding a mining machine during mining of a mineral seam. The mining machine including a first end includes a cutter head and a second end, and the mineral seam defines a seam plane, the method includes: providing a first laser, a second laser, and a third laser; providing a first indicator positioned on the second end of the machine and a target positioned adjacent the machine; aligning the first laser with the seam plane; aligning the second laser with the first indicator; aligning the third laser with the target; and operating the machine to mine material in the seam such that the first indicator remains aligned with the second laser and the target remains aligned with the third laser.

In still another embodiment, a mining machine includes a chassis, a cutter head, a drive mechanism coupled to the chassis and supporting the chassis for movement over a mine floor, a first light emitter, and a second light emitter. The chassis includes a first end and a second end and a longitudinal axis extending therebetween, and further includes a lower side and an upper side and a yaw axis extending therebetween. The cutter head is coupled to the first end of the chassis. The first light emitter is coupled to the chassis proximate the first end and projects light away from the chassis and in a direction parallel to the yaw axis. The second light emitter is coupled to the chassis proximate the second end and projects light away from the chassis and in a direction parallel to the yaw axis.

In still another embodiment, a mining machine includes a chassis, a cutter head, a drive mechanism coupled to the chassis and supporting the chassis for movement over a mine floor, and a light emitter coupled to the chassis. The chassis includes a first end and a second end and a longitudinal axis extending therebetween, and further includes a lower side and an upper side and a yaw axis extending therebetween. The cutter head is coupled to the first end of the chassis. The light emitter is coupled to the chassis and emits a fan laser away from the chassis in a direction parallel to the yaw axis. The fan laser projects a line onto a mine surface, wherein the line is maintained parallel to a predetermined direction as the drive mechanism advances the chassis.

In still another embodiment, a method for operating a mining machine having a chassis and a cutter head coupled to the chassis includes: creating a survey line on a mine roof, the survey line parallel to a predetermined direction of advance; emitting a first fan laser toward the mine roof, the fan laser projecting a first line onto the mine roof; emitting a second fan laser toward the mine roof, the fan laser projecting a second line onto the mine roof; and advancing the mining machine in the direction of advance such that the first line and the second line remain parallel to the survey line.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
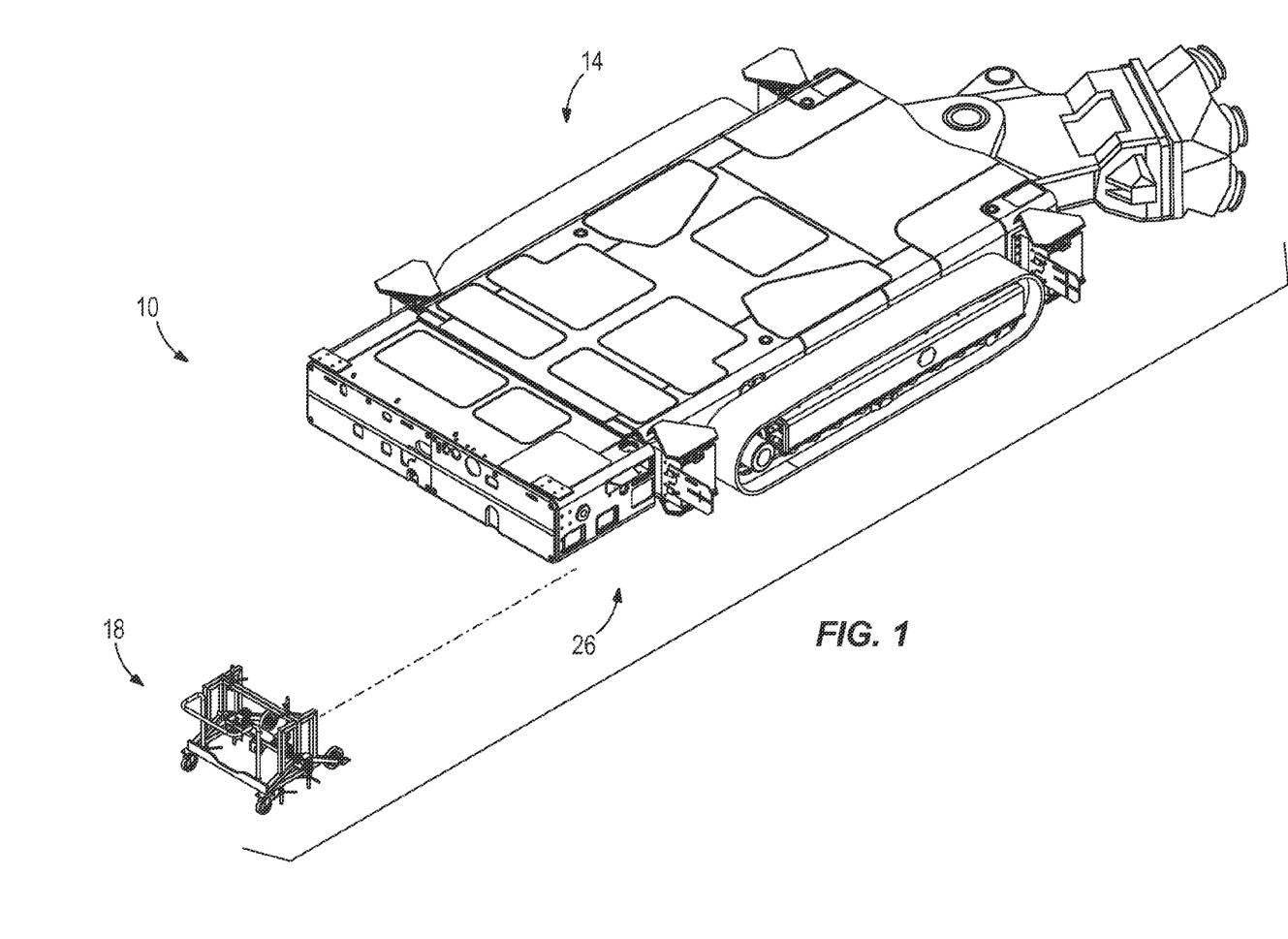
FIG. 1 is a perspective view of a guidance system according to one embodiment of the invention
Figure 2:
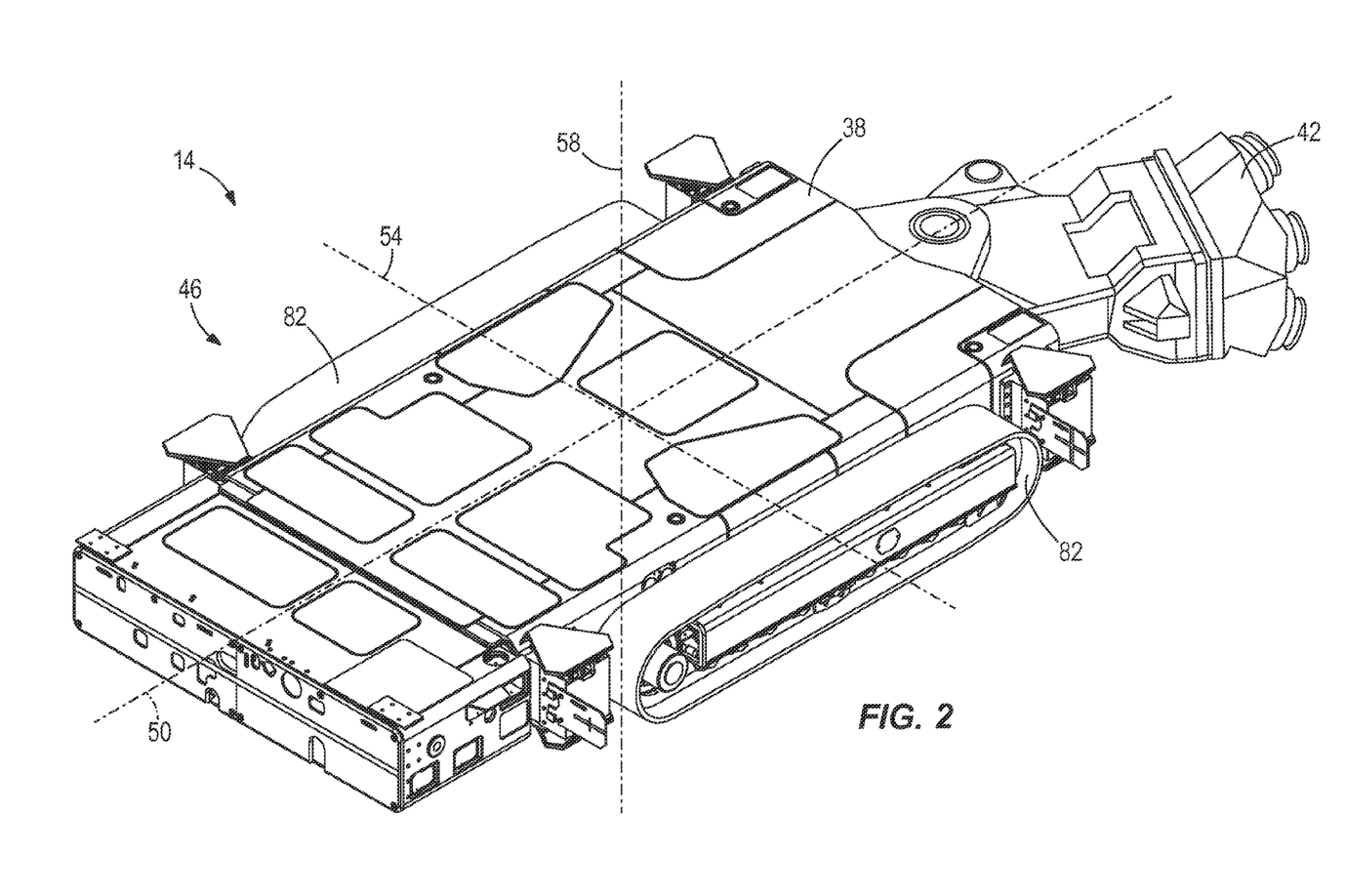
FIG. 2 is a perspective view of a mining machine.
Figure 8:
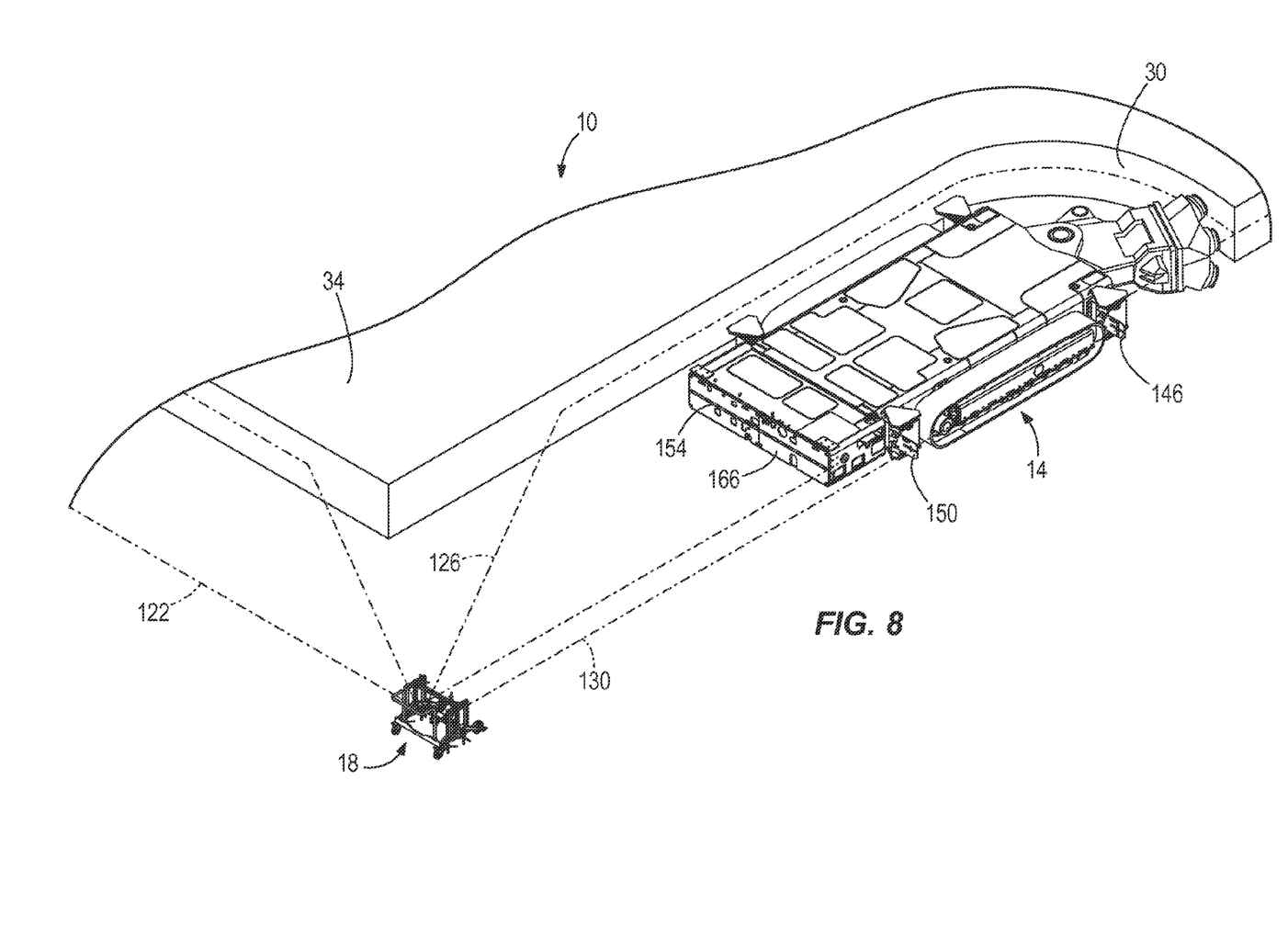
FIG. 8 is a perspective view of the guidance system of FIG. 1.

FIG. 1 shows a mining guidance system 10 including a continuous mining machine 14, a laser emitter trolley or carriage 18, and a guide assembly 26 coupled to the continuous mining machine 14. The mining machine 14 engages a work face 30 of a mineral seam 34 (FIG. 8). As shown in FIG. 2, the mining machine 14 includes a chassis or body 38, a cutter head 42 coupled to the body 38, and a drive system 46 for moving the body 38. The body 38 defines a roll axis 50, a pitch axis 54, and a yaw axis 58. The roll axis 50 extends longitudinally through the body 38. The pitch axis 54 extends transversely through the body 38, and the yaw axis 58 extends vertically through the body 38. In the illustrated embodiment, the drive system 46 includes a pair of tracks 82 on either side of the body 38. Other embodiments may use wheels to move the machine 14.

Figure 3:
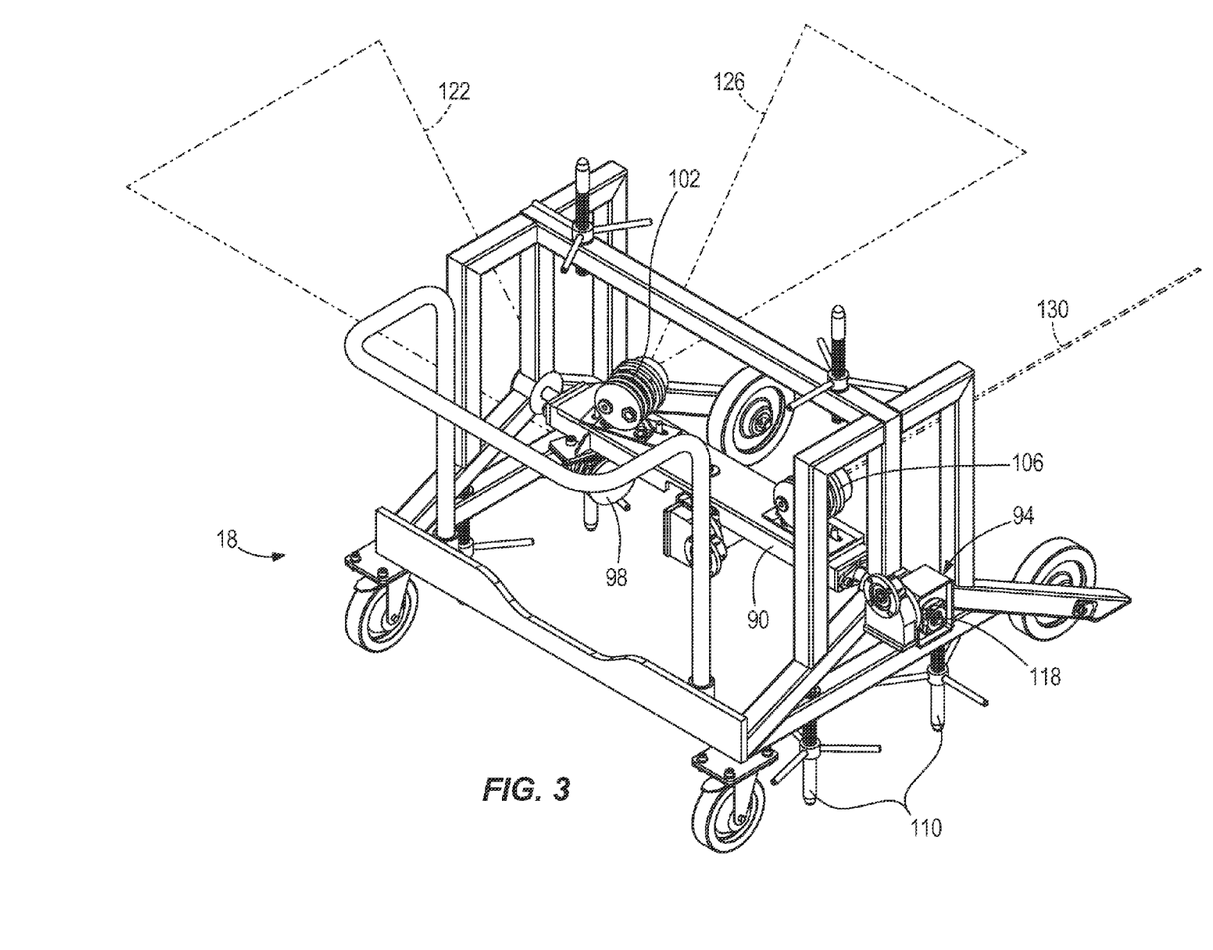
FIG. 3 is a perspective view of a laser emitter carriage.

As shown in FIG. 3, the laser emitter carriage 18 includes a base 90, an adjustment assembly 94, a first laser emitter 98, a second laser emitter 102, and a third laser emitter 106. The base 90 includes four wheels for moving the carriage 18 and multiple set screws 110 for securing the carriage 18 with respect to a mine floor. The adjustment assembly 94 includes a gearbox 118 for pivoting each of the laser emitters 98, 102, 106 with respect to the base 90. In the illustrated embodiment, the first laser emitter 98 projects a first planar laser 122. The first planar laser 122 extends toward the seam 34 in a planar manner. The second laser emitter 102 projects a second planar laser 126 extending toward the work face 30 of the seam 34. The third laser emitter 106 projects a laser beam 130 that extends toward the work face 30. The adjustment assembly 94 permits each laser emitter 98, 102, 106 to pivot in 3 dimensions, allowing the operator to position the planar lasers 122, 126 and the laser beam 130 with high precision. In one embodiment, the laser emitters 98, 102, 106 can be accurately adjusted for distances of up to 100 meters.

Figure 4:
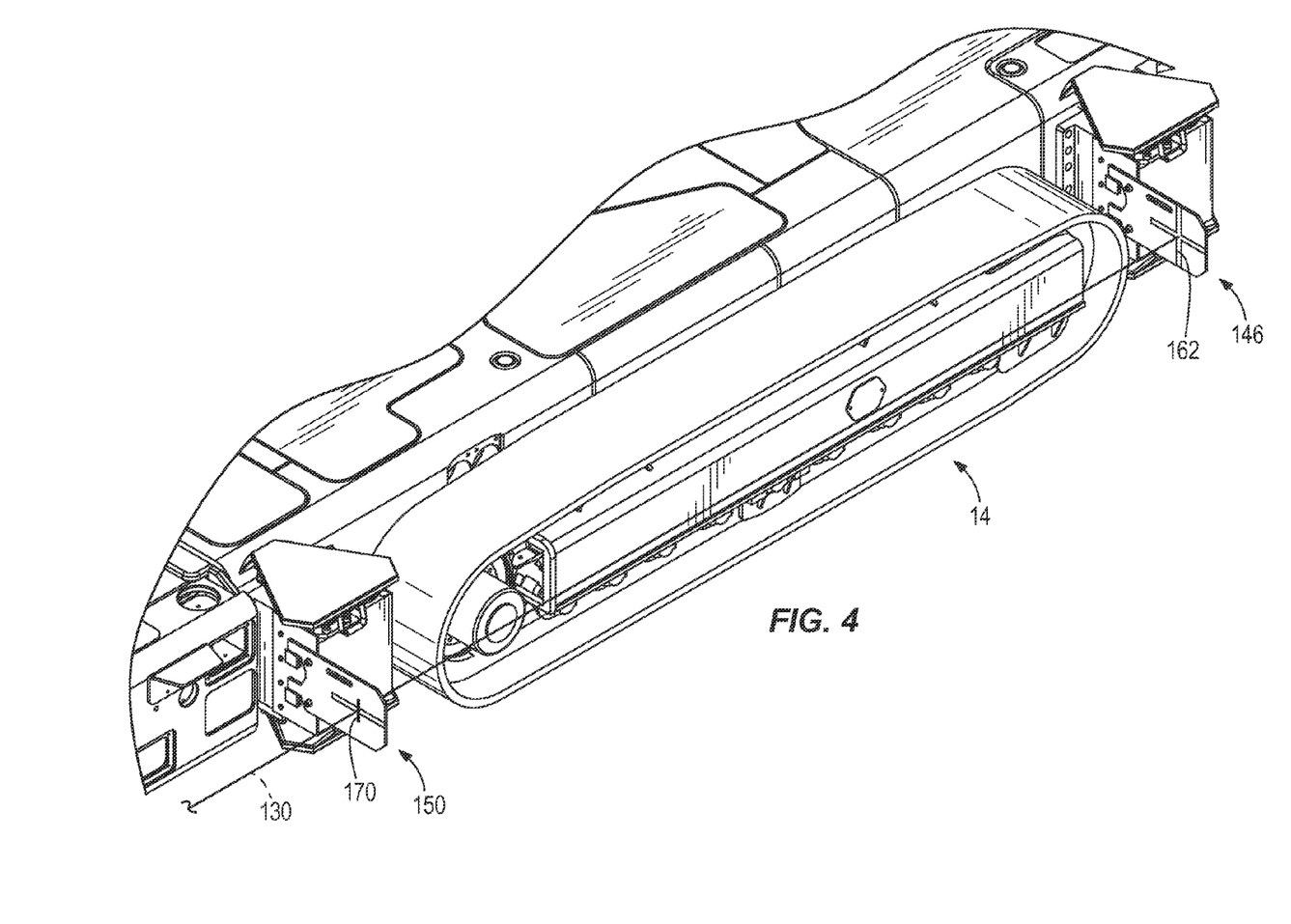
FIG. 4 is an enlarged perspective view of a right side of the mining machine of FIG. 2.
Figure 5:
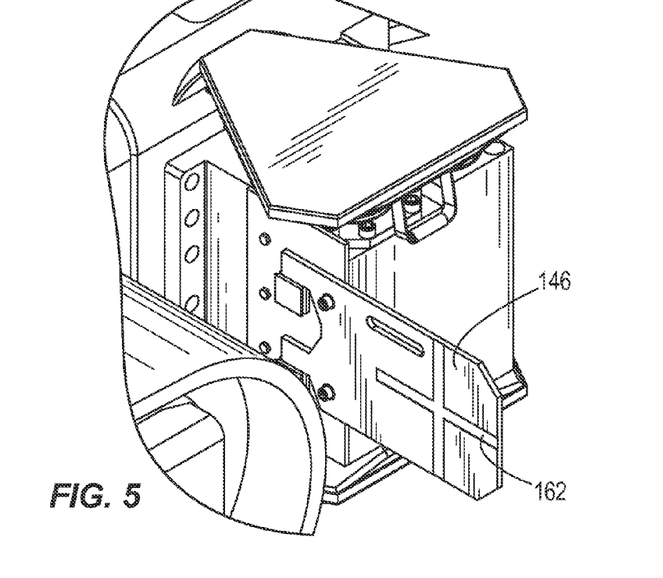
FIG. 5 is a perspective view of a first target.
Figure 6:
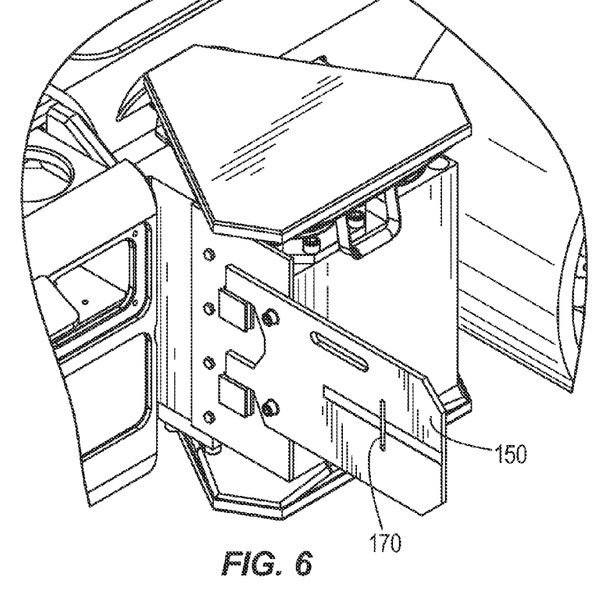
FIG. 6 is a perspective view of a second target.
Figure 7:
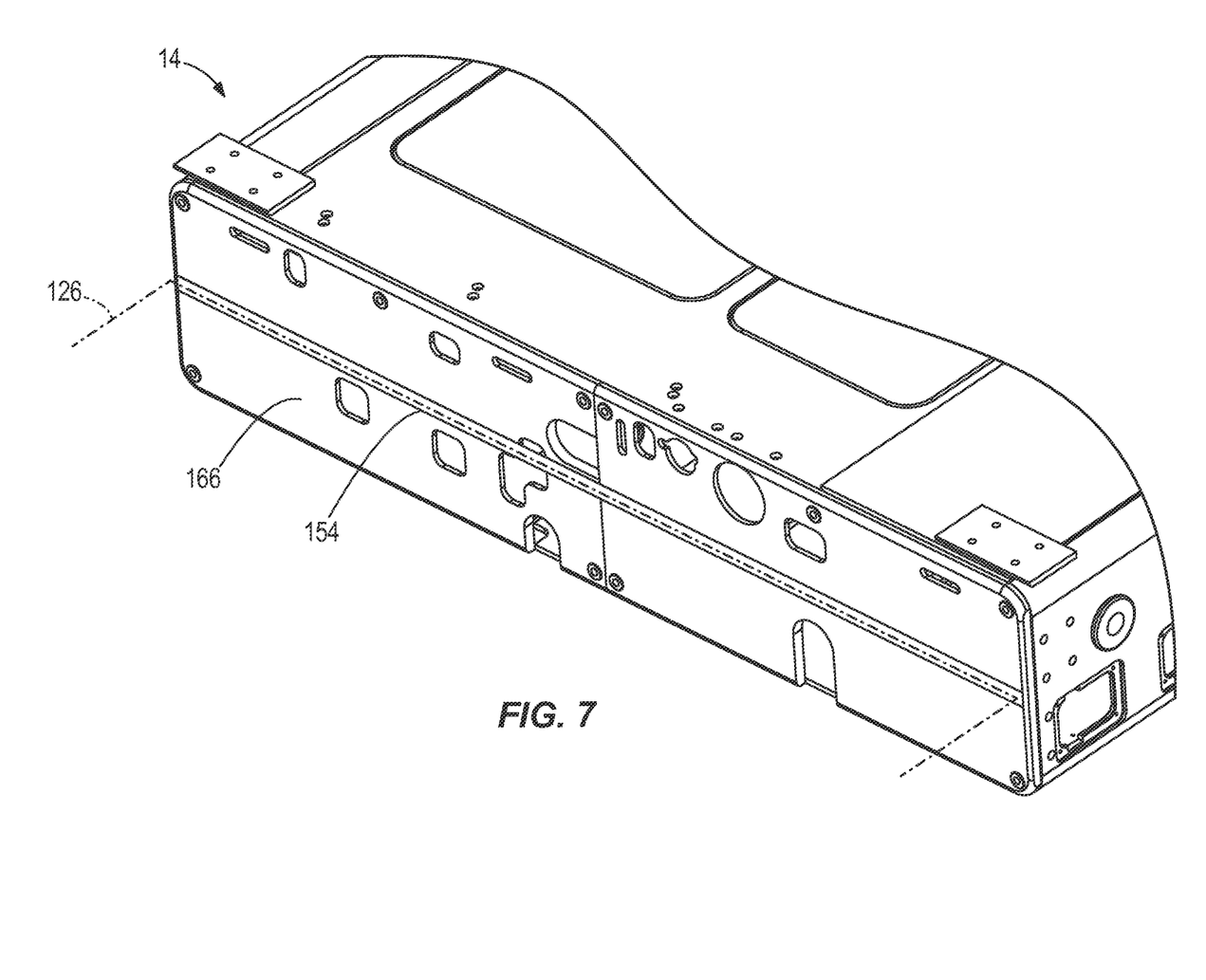
FIG. 7 is a perspective view of a rear indicator.

As shown in FIGS. 4-7, the guide assembly 26 includes a first target 146 (FIG. 4), a second target 150 (FIG. 4), and a level indicator 154 (FIG. 7). Referring to FIGS. 4 and 5, the first target 146 is coupled to the mining machine 14 on one side of the mining machine 14. The first target 146 extends away from the machine 14 and includes a cross-hair indicator 162. Referring to FIGS. 4 and 6, the second target 150 is coupled to the mining machine 14. The second target 150 is aligned with the first target 146 and includes a vertical slot 170. In the illustrated embodiment, both targets 146, 150 are mounted on the right side of the machine 14, with the first target 146 being positioned proximate the cutter head and the second target being positioned proximate the end 166 opposite the cutter head 42. As shown in FIG. 7, the level indicator 154 is positioned on the end 166 of the mining machine 14 and is formed as a linear marker extending across the end 166 of the machine 14. In other embodiments, the first target 146 and second target 150 may be mounted in other positions with respect to the machine 14, and the targets 146, 150 and level indicator 154 may include other marker configurations.

FIG. 8 shows the guidance system 10 in operation. The carriage 18 is positioned behind the mining machine 14 and the work face 30 of the seam 34. The carriage 18 is secured in place by inserting the set screws 110 into the mine floor. The first planar laser 122 is aligned with the effective mean of the seam 34. The effective mean is the plane that permits the optimum mine yield to be extracted by the mining operation. The method for identifying the effective mean is known by persons of ordinary skill in the art, and is further description of this feature is not necessary. The second planar laser 126 is aligned with the level indicator 154, and the laser beam 130 is aligned to pass through the vertical slot 170 (FIG. 4) of the second target 150 and hit the cross-hair indicator 162 (FIG. 4) on the first target 146. The mining machine 14 is then trammed into position adjacent the work face 30 and commences extracting material from the work face 30.

As the mining machine 14 proceeds through the seam 34, the operator monitors the three laser projections 122, 126, and 130 to insure that each remains aligned so that the machine 14 extracts the optimum yield. Maneuvering the machine 14 by a remote control, the operator refers to the position of the laser projections 122, 126, and 130 as guides for adjusting the position and orientation of the machine 14. During advance and before commencing the subsequent cutting sequence, the positions of the laser projections 122, 126, and 130 are checked and, if required, the orientation of the mining machine 14 is adjusted to ensure accurate direction control and positioning is maintained.

Figure 9:
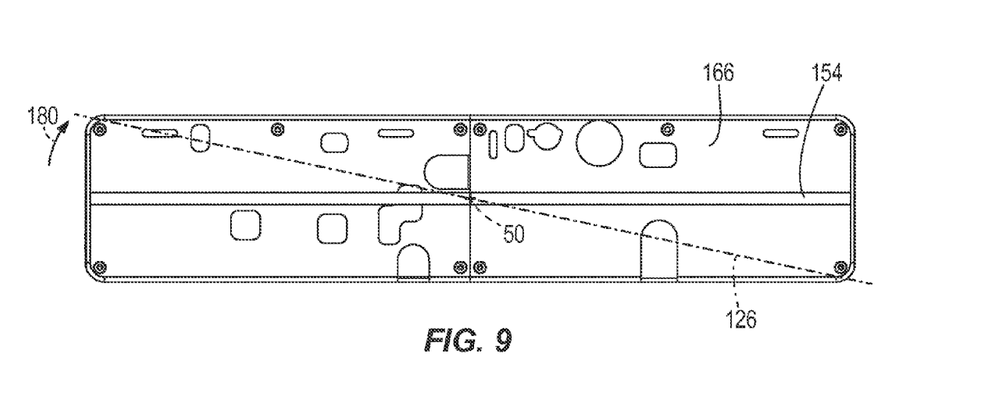
FIG. 9 is a rear view of an end of the mining machine of FIG. 2.

Observation of the second planar laser 126 on the level indicator 154 provides information regarding the orientation of the mining machine 14 with respect to the roll axis 50. For example, if the left side of the machine 14 dips below the second planar laser 126 as shown in FIG. 9, the operator maneuvers the mining machine 14 to raise the left side. This action rotates the machine 14 in the direction 180 until the second planar laser 126 is aligned with the level indicator 154.

Figure 10:
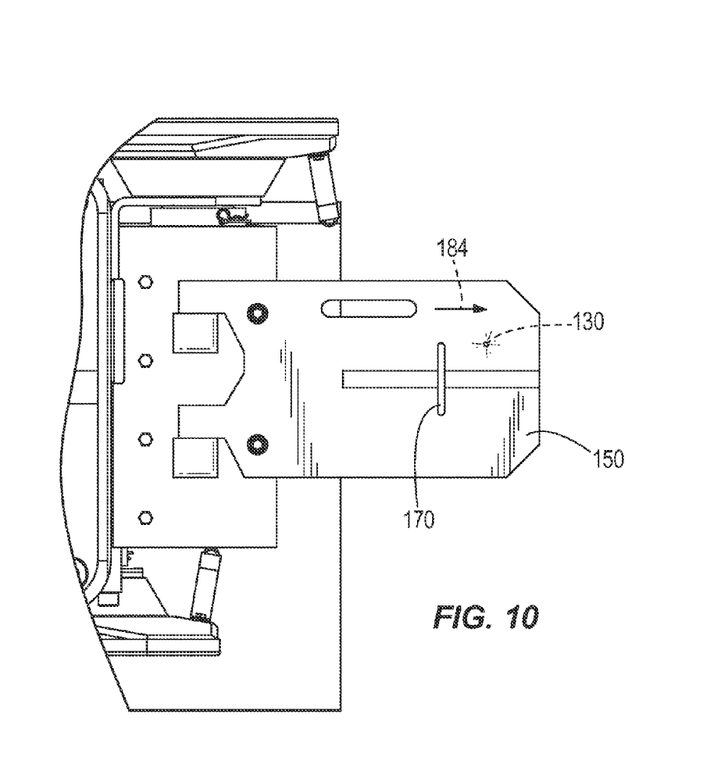
FIG. 10 is a rear view of the second target of FIG. 6.

Observation of the laser beam 130 on the first target 146 and the second target 150 provides information regarding the orientation of the machine 14 with respect to the pitch axis 54 (FIG. 2) and the yaw axis 58 (FIG. 2). If the machine 14 is out of position the laser beam 130 will shine onto the second target 150, indicating how to correct the orientation of the mining machine 14. For instance, referring to FIG. 10, if the laser beam 130 is located in the top right corner of the second target 150, the operator steers the machine 14 to the left. This movement causes the second target 150 to move in the direction 184 until the laser beam 130 is aligned with the vertical slot 170. If the laser beam 130 then shines on the first target 146 and is above the center of the cross-hair indicator 162, the operator angles the front of the machine 14 upward. This action moves the first target 146 upward with respect to the laser beam 130. When the laser beam 130 shines through the vertical slot 170 of the second target 150 and hits the center of the cross-hair indicator 162, the mining machine 14 is aligned and the mining operation proceeds. The distance of the third laser emitter 106 from the open face determines the width of the cut.

After a cut is made, the laser emitters 98, 102, 106 are moved or adjusted again to provide a guide for the next phase of the mining operation. By establishing an alignment between the laser projections 122, 126, 130 and the guide assembly 26, the guidance system 10 insures that mining machine 14 remains "on seam", or aligned with the effective mean of the mineral seam 34, even if the seam 34 is inclined at an angle.

FIGS. 11-14 illustrate another embodiment of the guidance system 410. For brevity, only differences between the guidance system 410 and the guidance system 10 will be described in detail. Similar parts are identified with the same reference number, plus 400.

Figure 11:
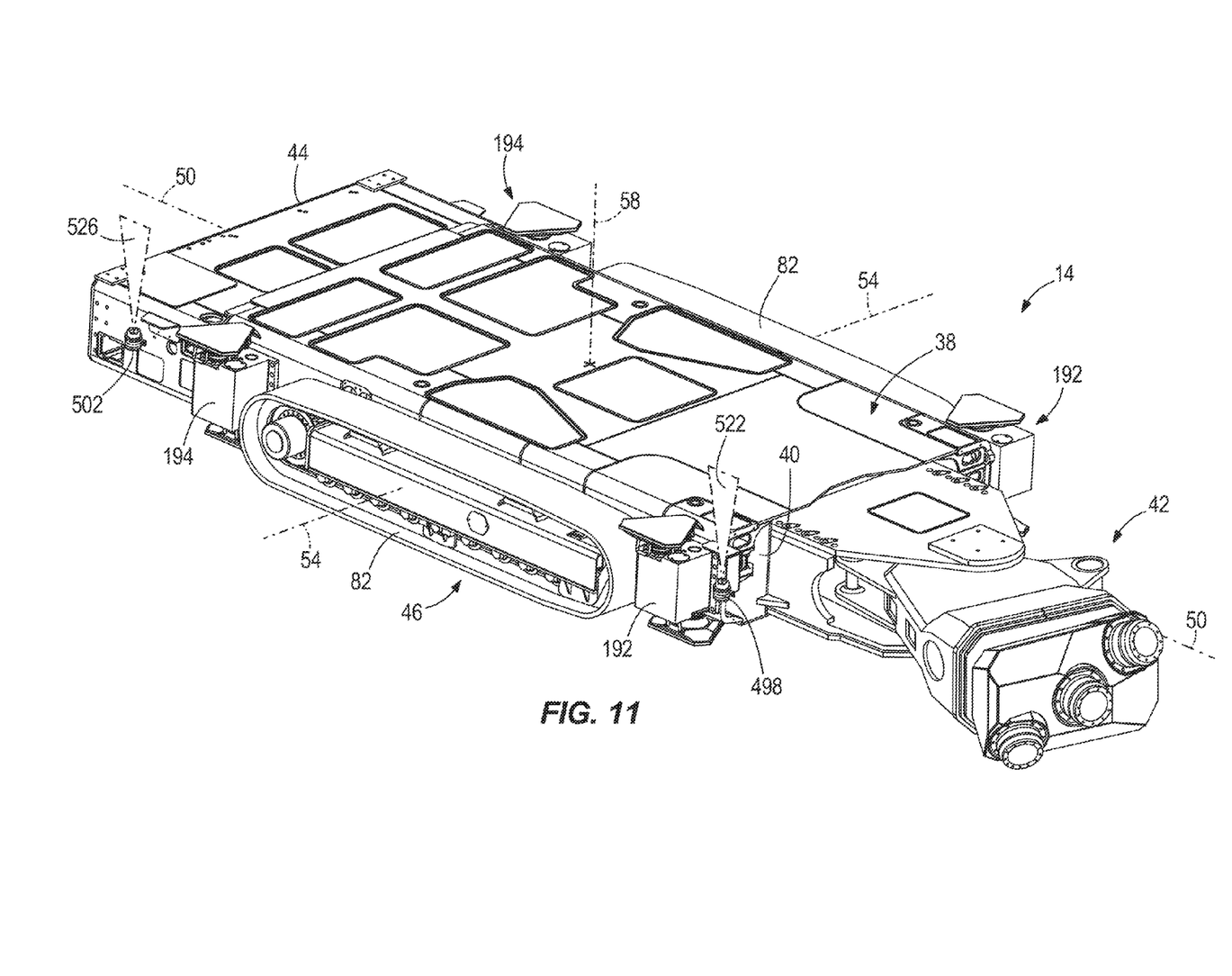
FIG. 11 is a perspective view of a mining machine including a guidance system according to another embodiment.
Figure 12:
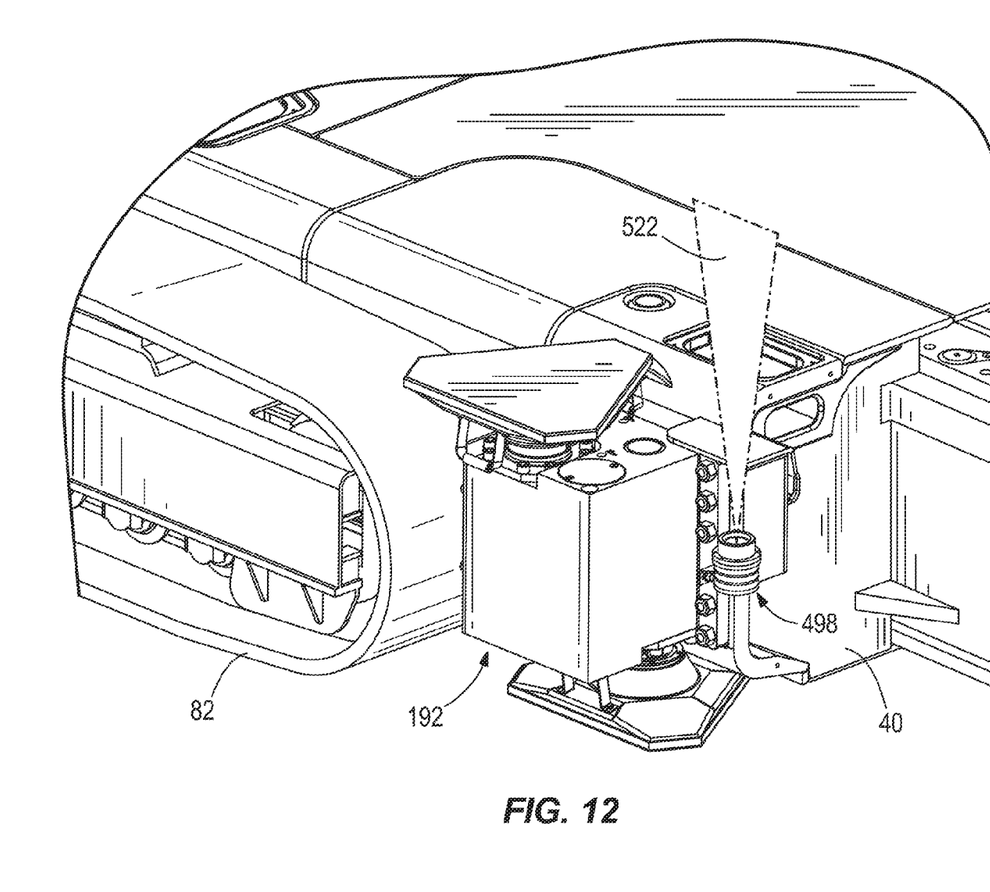
FIG. 12 is an enlarged perspective view of a portion of the mining machine of FIG. 11.
Figure 13:
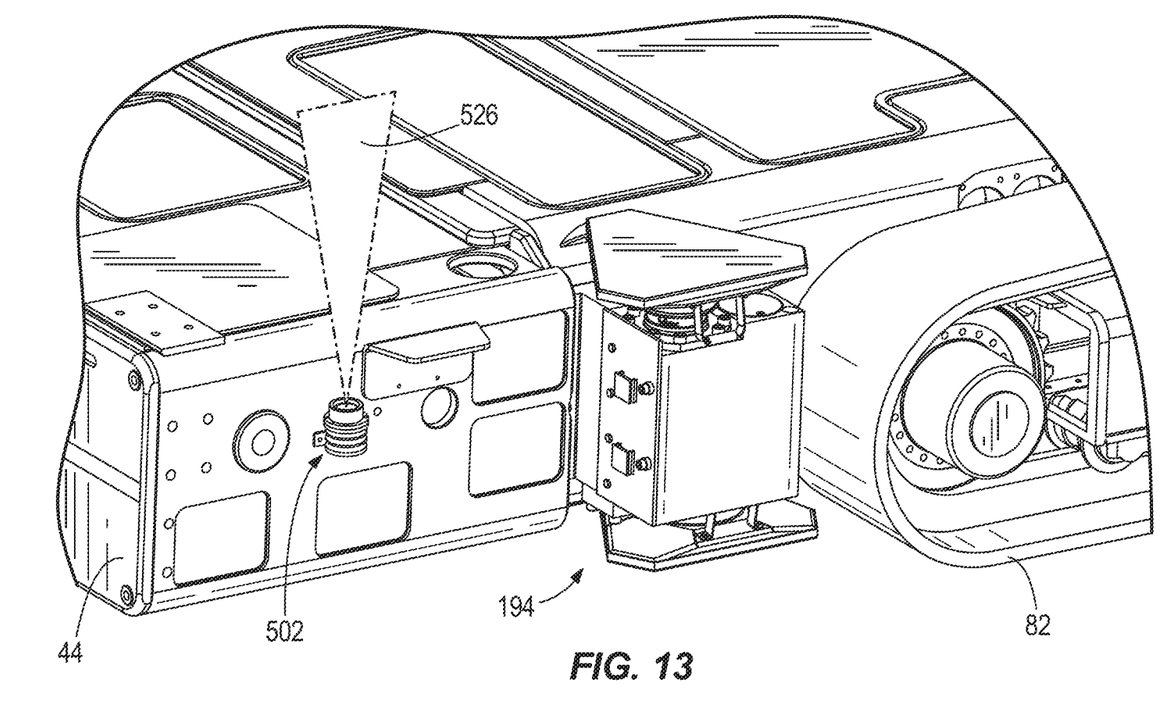
FIG. 13 is an enlarged perspective view of a portion of the mining machine of FIG. 11.

As shown in FIG. 11, the guidance system 410 includes a first light emitter 498 and a second light emitter 502. The first light emitter 498 is coupled to the mining machine 14 proximate a first or front end 40 (i.e., proximate the cutter head 42), while the second light emitter 502 is positioned proximate a second or rear end 44 of the machine 14. In the illustrated embodiment, the machine 14 includes a pair of a forward jacks 192 proximate the front end 40 and a pair of rear jacks 194 proximate the rear end 44. The jacks 192, 194 are extendable in a direction parallel to the yaw axis 58 to elevate the body 38 and support the machine 14 relative to the mine floor or mine roof.

In the illustrated embodiment, the first light emitter 498 is positioned forward of the drive system 46 and is positioned adjacent a forward jack 192, while the second light emitter 502 is positioned rearward of the drive system 46 and adjacent a rear jack 194. Also, in the illustrated embodiment, both the first emitter 498 and the second emitter 502 are positioned on a right side of the body 38. In other embodiments, the emitters 498, 502 may be positioned on another side or may be positioned between the left and right side. In addition, additional emitters may be coupled to the body 38. The first light emitter 498 emits a first laser projection 522 and the second light emitter 502 emits a second laser projection 526.

Figure 14:
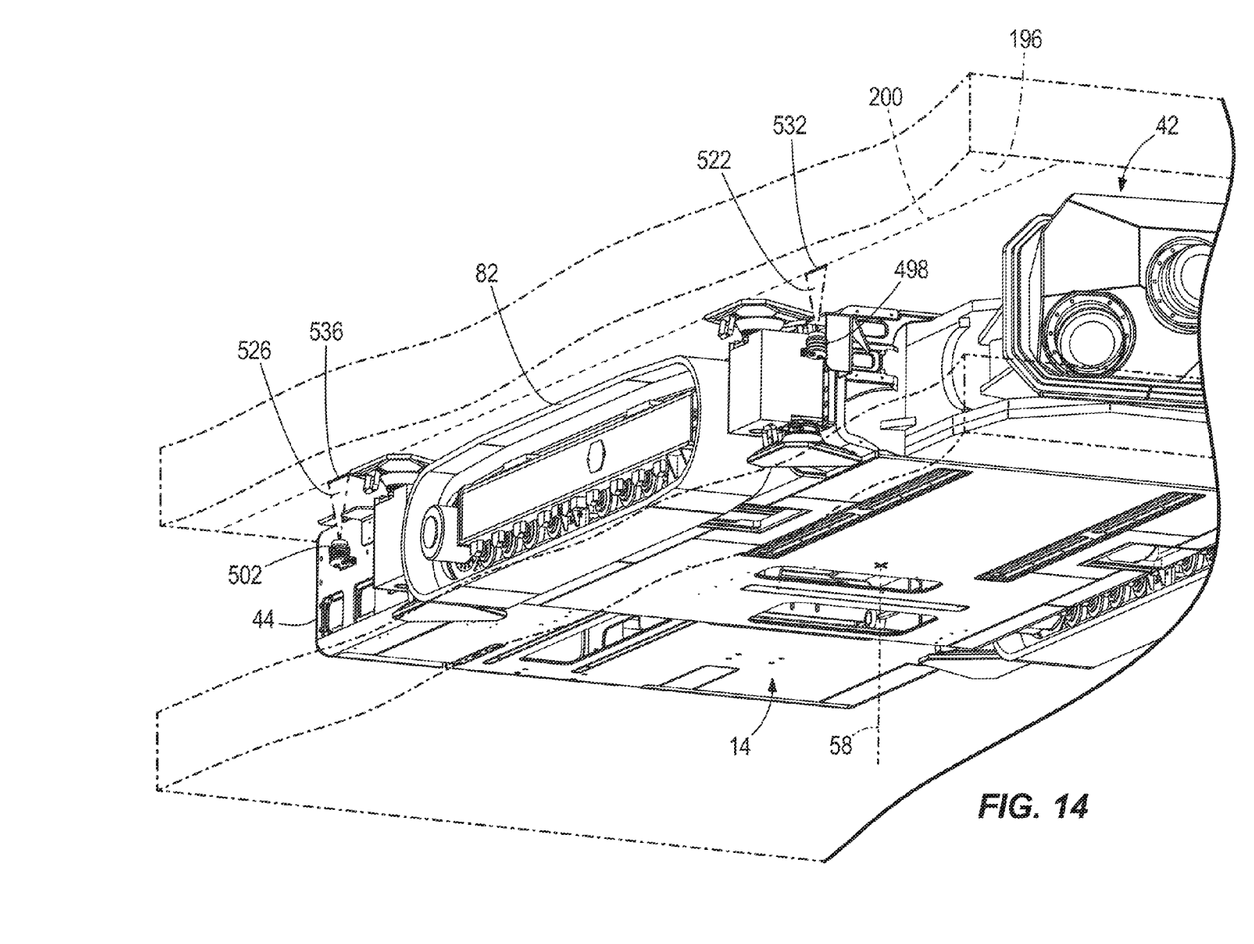
FIG. 14 is a perspective view of the mining machine of FIG. 11 positioned adjacent a mine wall.

In the illustrated embodiment, the light emitters 498, 502 are fan lasers such that the first projection 522 and the second projection 526 have a planar shape. In the illustrated embodiment, the first projection 522 and the second projection 526 and are in-line with one another such that the first projection 522 and the second projection 526 lie in a common plane. In the illustrated embodiment, the plane defined by the first and second projections 522, 526 is oriented parallel to the longitudinal or roll axis 50 and extends perpendicular from the roll axis 50 toward a hanging wall or mine roof 196 (FIG. 14). Stated another way, the first and second projections 522, 526 may extend perpendicular to both the roll axis 50 and the pitch axis 54 (FIG. 11). In some embodiments, the plane defined by the projections 522, 526 extends parallel to the yaw axis 58 (FIG. 11). The plane defined by the first projection 522 and second projection 526 is generally parallel to the direction of advance of the mining machine 14.

As best shown in FIG. 14, each of the projections 522, 526 form straight lines 532, 536, respectively on the roof 196. Depending on the size of the laser projections 522, 526, the lines 532, 536 may overlap and appear as a solid continuous line or as separate line segments spaced apart by one or more gaps.

Before the mining operation, a line 200 (FIG. 14) is drawn on the roof 196 and is aligned with a predetermined cutting direction or the direction of advance for the mining machine 14. An operator may use this line 200 or may create (e.g., with a spray can) a second line parallel to the line 200. In the illustrated embodiment shown in FIG. 14, the machine 14 is positioned such that the projections 522, 526 are aligned with the line 200 to align the machine with the direction of advance. During operation, the operator monitors the position of the projections 522, 526 relative to the line 200 to insure that the machine maintains alignment. The line 200 is extended a sufficient distance to insure that the machine 14 can start and complete a full cutting cycle.

The guidance system 410 provides a simple and straightforward system for aligning the machine 10 as the machine advances through a mine seam. The guidance system 410 reduces the calibration and set-up time, therefore reducing machine downtime between cutting cycles.

Thus, the invention provides, among other things, a guidance system for a mining machine. Various features and advantages of the invention are set forth in the following claims.

What is claimed is:

1. A mining machine comprising:
   a chassis including a first end and a second end and a longitudinal axis extending therebetween, the chassis further including a lower side and an upper side and a yaw axis extending therebetween;
   a cutter head coupled to the first end of the chassis;
   a drive mechanism coupled to the chassis and supporting the chassis for movement over a mine floor;
   a first light emitter coupled to the chassis proximate the first end, the first light emitter projecting light away from the chassis and in a direction parallel to the yaw axis, the light projected by the first light emitter projecting a line onto a mine surface; and
   a second light emitter coupled to the chassis proximate the second end, the second light emitter projecting light away from the chassis and in a direction parallel to the yaw axis,
   wherein the line is a first line, and the light projected by the second light emitter projects a second line onto the mine surface, wherein the first line and the second line are collinear.

2. The mining machine of claim 1, wherein the first line and the second line are configured to be parallel to a survey line drawn on a mine roof.

3. The mining machine of claim 1, wherein the first light emitter projects a first laser projection defining a first fan plane and the second light emitter projects a second laser projection defining a second fan plane parallel to the first fan plane.

4. The mining machine of claim 1, wherein the chassis further includes a right side and a left side and a pitch axis extending therebetween, wherein the first light emitter and the second light emitter are coupled to the chassis proximate one of the right side and the left side.

5. The mining machine of claim 1, further comprising a jack coupled to the chassis, the jack being extendable in a direction parallel to the yaw axis, the jack positioned proximate the first light emitter.

6. The mining machine of claim 1, wherein the first line and the second line appear as separate line segments spaced apart by at least one gap.

7. A mining machine comprising:
a chassis including a first end and a second end and a longitudinal axis extending therebetween, the chassis further including a lower side and an upper side and a yaw axis extending therebetween;
a cutter head coupled to the first end of the chassis;
a drive mechanism coupled to the chassis and supporting the chassis for movement over a mine floor; and
a light emitter coupled to the chassis, the first light emitter emitting a fan laser away from the chassis in a direction parallel to the yaw axis, the fan laser projecting a line onto a mine surface,
wherein the line is maintained parallel to a predetermined direction as the drive mechanism advances the chassis.

8. The mining machine of claim 7, wherein the light emitter is a first light emitter positioned proximate the first end of the chassis, and further comprising a second light emitter coupled to the chassis proximate the second end, the second light emitter emitting a fan laser away from the chassis in a direction parallel to the yaw axis.

9. The mining machine of claim 8, wherein the light projected by the second light emitter projects a second line onto the mine surface, wherein the first line and the second line are collinear.

10. The mining machine of claim 8, wherein the chassis further includes a right side and a left side and a pitch axis extending therebetween, wherein the first light emitter and the second light emitter are coupled to the chassis proximate one of the right side and the left side.

11. The mining machine of claim 7, further comprising a first jack coupled to the chassis proximate the first light emitter and a second jack coupled to the chassis proximate the second light emitter, the first jack and the second jack being extendable in a direction parallel to the yaw axis.

12. The mining machine of claim 9, wherein the first line and the second line appear as separate line segments spaced apart by at least one gap.

13. The mining machine of claim 9, wherein the first line and the second line are configured to be parallel to a survey line drawn on a mine roof.

14. A method for operating a mining machine including a chassis and a cutter head coupled to the chassis, the method comprising:
creating a survey line on a mine roof, the survey line parallel to a predetermined direction of advance;
emitting a first fan laser toward the mine roof, the fan laser projecting a first line onto the mine roof;
emitting a second fan laser toward the mine roof, the fan laser projecting a second line onto the mine roof; and
advancing the mining machine in the direction of advance such that the first line and the second line remain parallel to the survey line.

15. The method of claim 14, wherein advancing the mining machine includes adjusting the orientation of the chassis in the event that the first line or the second line become misaligned relative to the survey line.

* * * * *